(12) United States Patent
Droux et al.

(10) Patent No.: US 7,672,299 B2
(45) Date of Patent: Mar. 2, 2010

(54) NETWORK INTERFACE CARD VIRTUALIZATION BASED ON HARDWARE RESOURCES AND SOFTWARE RINGS

(75) Inventors: Nicolas G. Droux, Rio Rancho, NM (US); Sunay Tripathi, San Jose, CA (US); Kais Belgaied, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 785 days.

(21) Appl. No.: 11/479,046

(22) Filed: Jun. 30, 2006

(65) Prior Publication Data
US 2008/0002701 A1  Jan. 3, 2008

(51) Int. Cl.
- *H04L 12/50* (2006.01)
- *H04Q 11/00* (2006.01)
- *H04L 12/28* (2006.01)
- *H04L 12/56* (2006.01)

(52) U.S. Cl. .................................. 370/359; 370/419
(58) Field of Classification Search .................. None
See application file for complete search history.

(56) References Cited

U.S. PATENT DOCUMENTS

| | | | |
|---|---|---|---|
| 5,751,951 A * | 5/1998 | Osborne et al. ............ 709/250 |
| 6,041,053 A | 3/2000 | Douceur et al. | |
| 6,070,219 A | 5/2000 | McAlpine et al. | |
| 6,131,163 A | 10/2000 | Wiegel | |
| 6,163,539 A | 12/2000 | Alexander et al. | |
| 6,477,643 B1 | 11/2002 | Vorbach et al. | |
| 6,600,721 B2 | 7/2003 | Edholm | |
| 6,714,960 B1 | 3/2004 | Bitar et al. | |
| 6,757,731 B1 | 6/2004 | Barnes et al. | |
| 6,831,893 B1 | 12/2004 | Ben Nun et al. | |
| 6,859,841 B2 | 2/2005 | Narad et al. | |
| 6,944,168 B2 | 9/2005 | Paatela et al. | |
| 7,046,665 B1 | 5/2006 | Walrand et al. | |
| 7,146,431 B2 | 12/2006 | Hipp et al. | |
| 7,177,311 B1 | 2/2007 | Hussain et al. | |

(Continued)

OTHER PUBLICATIONS

Dovrolis, C., Thayer, B. and Ramanathan, P.: "HIP: Hybrid Interrupt—Polling for the Network Interface", ACM SIGOPS Operating Systems Review, vol. 35, Iss. 4, Oct. 2001 (11 Pages).

(Continued)

*Primary Examiner*—Gregory B Sefcheck
*Assistant Examiner*—Suk Jin Kang
(74) *Attorney, Agent, or Firm*—Osha • Liang LLP (57) ABSTRACT

A method for virtualizing a network interface card includes creating a first plurality of virtual NICs, assigning each of a plurality of receive rings on the network interface card (NIC) to one of the first plurality of virtual NICs, and if the number of virtual NICs is greater than the number of receive rings on the NIC, creating a first software ring corresponding to one of the plurality of receive rings on the NIC, creating a first plurality of software receive rings associated with the first software ring, creating a second plurality of virtual NICs, and assigning each of the first plurality of software receive rings to one of the second plurality of virtual NICs, wherein the plurality of receive rings is less than a sum of the first plurality of virtual NICs and the second plurality of virtual NICs.

19 Claims, 5 Drawing Sheets

U.S. PATENT DOCUMENTS

| | | |
|---|---|---|
| 7,260,102 B2 | 8/2007 | Mehrvar et al. |
| 7,313,142 B2 | 12/2007 | Matsuo et al. |
| 2002/0052972 A1 | 5/2002 | Yim |
| 2003/0037154 A1 | 2/2003 | Poggio et al. |
| 2005/0135243 A1 | 6/2005 | Lee et al. |
| 2005/0138620 A1 | 6/2005 | Lewites |
| 2005/0207407 A1* | 9/2005 | Baumberger ............... 370/389 |
| 2006/0041667 A1 | 2/2006 | Ahn et al. |
| 2006/0070066 A1 | 3/2006 | Grobman |
| 2006/0174324 A1 | 8/2006 | Zur et al. |
| 2006/0200821 A1* | 9/2006 | Cherkasova et al. ............ 718/1 |
| 2007/0162572 A1* | 7/2007 | Aloni et al. ................. 709/219 |
| 2007/0162701 A1* | 7/2007 | Schlansker et al. .......... 711/118 |
| 2007/0244972 A1* | 10/2007 | Fan ........................... 709/205 |

OTHER PUBLICATIONS

"Solaris Networking—The Magic Revealed (Part I)"; Sunay Tripathi's Solaris Networking Weblog; Nov. 14, 2005, pp. 1-22 (22 pages).

* cited by examiner

NETWORK INTERFACE CARD VIRTUALIZATION BASED ON HARDWARE RESOURCES AND SOFTWARE RINGS

CROSS-REFERENCE TO RELATED APPLICATIONS

The present application contains subject matter that may be related to the subject matter in the following U.S. applications filed on Apr. 22, 2005, and assigned to the assignee of the present application: "Method and Apparatus for Managing and Accounting for Bandwidth Utilization Within A Computing System" with U.S. application Ser. No. 11/112,367; "Method and Apparatus for Consolidating Available Computing Resources on Different Computing Devices" with U.S. application Ser. No. 11/112,368; "Assigning Higher Priority to Transactions Based on Subscription Level" with U.S. application Ser. No. 11/112,947; "Method and Apparatus for Dynamically Isolating Affected Services Under Denial of Service Attack" with U.S. application Ser. No. 11/112,158; "Method and Apparatus for Improving User Experience for Legitimate Traffic of a Service Impacted by Denial of Service Attack" with U.S. application Ser. No. 11/112,629; "Method and Apparatus for Limiting Denial of Service Attack by Limiting Traffic for Hosts" with U.S. application Ser. No. 11/112,328; "Hardware-Based Network Interface Per-Ring Resource Accounting" with U.S. application Ser. No. 11/112,222; "Dynamic Hardware Classification Engine Updating for a Network Interface" with U.S. application Ser. No. 11/112,934; "Network Interface Card Resource Mapping to Virtual Network Interface Cards" with U.S. application Ser. No. 11/112,063; "Network Interface Decryption and Classification Technique" with U.S. application Ser. No. 11/112,436; "Method and Apparatus for Enforcing Resource Utilization of a Container" with U.S. application Ser. No. 11/112,910; "Method and Apparatus for Enforcing Packet Destination Specific Priority Using Threads" with U.S. application Ser. No. 11/112,584; "Method and Apparatus for Processing Network Traffic Associated with Specific Protocols" with U.S. application Ser. No. 11/112,228.

The present application contains subject matter that may be related to the subject matter in the following U.S. applications filed on Oct. 21, 2005, and assigned to the assignee of the present application: "Method and Apparatus for Defending Against Denial of Service Attacks" with U.S. application Ser. No. 11/255,366; "Router Based Defense Against Denial of Service Attacks Using Dynamic Feedback from Attacked Host" with U.S. application Ser. No. 11/256,254; and "Method and Apparatus for Monitoring Packets at High Data Rates" with U.S. application Ser. No. 11/226,790.

The present application contains subject matter that may be related to the subject matter in the following U.S. applications filed on Jun. 30, 2006, and assigned to the assignee of the present application: "Method and System for Controlling Virtual Machine Bandwidth" with U.S. application Ser. No. 11/480,000; "Virtual Switch" with U.S. application Ser. No. 12/580,698; "System and Method for Virtual Network Interface Cards Based on Internet Protocol Addresses" with U.S. application Ser. No. 11/479,997; "Virtual Network Interface Card Loopback Fastpath" with U.S. application Ser. No. 11/479,947; "Bridging Network Components" with U.S. application Ser. No. 11/479,947; "Reflecting the Bandwidth Assigned to a Virtual Network Interface Card Through Its Link Speed" with U.S. application Ser. No. 11/479,161; "Method and Apparatus for Containing a Denial of Service Attack Using Hardware Resources on a Virtual Network Interface Card" with U.S. application Ser. No. 11/480,100; "Virtual Network Interface Cards with VLAN Functionality" with U.S. application Ser. No. TBD 11/479,998; "Method and Apparatus for Dynamic Assignment of Network Interface Card Resources" with U.S. application Ser. No. 11/479,817; "Generalized Serialization Queue Framework for Protocol Processing" with U.S. application Ser. No. 11/479,947; "Serialization Queue Framework for Transmitting Packets" with U.S. application Ser. No. 11/479,143;

BACKGROUND

Network traffic is transmitted from a network, such as the Internet, from a sending system (e.g., a computer system) to a receiving system (e.g., a computer system) via a network interface card (NIC). The NIC is a piece of hardware found in a typical computer system that includes functionality to send and receive network traffic. Typically, network traffic is transmitted in the form of packets, where each packet includes a header and a payload. The header contains information regarding the source address, destination address, size, transport protocol used to transmit the packet, and various other identification information associated with the packet. The payload contains the actual data to be transmitted from the network to the receiving system.

Each of the packets sent between the sending system and receiving system is typically associated with a connection. The connection ensures that packets from a given process on the sending system reach the appropriate process on the receiving system. Packets received by the receiving system (via a NIC associated with the receiving system) are analyzed by a classifier to determine the connection associated with the packet.

Typically, the classifier includes a connection data structure that includes information about active connections on the receiving system. The connection data structure may include the following information about each active connection: (i) the queue associated with the connection; and (ii) information necessary to process the packets on the queue associated with the connection. Depending on the implementation, the connection data structure may include additional information about each active connection. Such queues are typically implemented as first-in first-out (FIFO) queues and are bound to a specific central processing unit (CPU) on the receiving computer system. Thus, all packets for a given connection are placed in the same queue and are processed by the same CPU. In addition, each queue is typically configured to support multiple connections.

Once the classifier determines the connection associated with the packets, the packets are sent to a temporary data structure (e.g., a receive ring on the NIC) and an interrupt is issued to the CPU associated with the queue. In response to the interrupt, a thread associated with the CPU (to which the serialization queue is bound) retrieves the packets from the temporary data structure and places them in the appropriate queue. Once packets are placed in the queue, those packets are processed in due course. In some implementations, the queues are implemented such that only one thread is allowed to access a given queue at any given time.

SUMMARY

In general, in one aspect, the invention relates to a method for virtualizing a network interface card, comprising creating a first plurality of virtual NICs, assigning each of a plurality of receive rings on the network interface card (NIC) to one of the first plurality of virtual NICs, and if the number of virtual NICs is greater than the number of receive rings on the NIC, creating a first software ring corresponding to one of the plurality of receive rings on the NIC, creating a first plurality of software receive rings associated with the first software ring, creating a second plurality of virtual NICs, and assigning each of the first plurality of software receive rings to one of the second plurality of virtual NICs, wherein the plurality of receive rings is less than a sum of the first plurality of virtual NICs and the second plurality of virtual NICs.

In general, in one aspect, the invention relates to a system, comprising a network interface card (NIC) comprising a plurality of receive rings and a host operatively connected to the NIC comprising a first plurality of virtual NICs, a first software ring, a first plurality of software receive rings associated with the first software ring, and a second plurality of virtual NICs, wherein each of the plurality of receive rings is associated with one selected from a group consisting of one of the first plurality of virtual NICs and the first software ring, and wherein at least one of the first plurality of software receive rings is associated with one of the second plurality of virtual NICs.

In general, in one aspect, the invention relates to a computer usable medium having computer readable program code embodied therein for causing a computer system to execute a method for virtualizing a network interface card (NIC), the method comprising creating a first plurality of virtual NICs, assigning each of a plurality of receive rings on the network interface card (NIC) to one of the first plurality of virtual NICs, and if the number of virtual NICs is greater than the number of receive rings on the NIC, creating a first software ring corresponding to one of the plurality of receive rings on the NIC, creating a first plurality of software receive rings associated with the first software ring, creating a second plurality of virtual NICs, and assigning each of the first plurality of software receive rings to one of the second plurality of virtual NICs, wherein the plurality of receive rings is less than a sum of the first plurality of virtual NICs and the second plurality of virtual NICs.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus to virtualize network interface cards (NICs). In one or more embodiments of the invention, each virtual NIC is associated with a serialization stack containing a virtual serialization queue and a virtual protocol stack. In one or more embodiments of the invention, virtual NICs are associated with packet destinations, which may be containers, virtual machines, or services. Further, packets may be transmitted either through polling mode or interrupt mode.

Further, embodiments of the invention provide a method and apparatus to virtualize NICs when the number of virtual NICs exceeds the number of receive rings on the physical NIC. In one or more embodiments of the invention, each receive ring on the physical NIC is associated with a virtual NIC. When there are many virtual NICs and not enough receive rings in hardware, one or more software rings are created on top of a receive ring to further route packets. In one or more embodiments of the invention, software receive rings are created within the software ring, and virtual NICs are created on top of the software receive rings.

Figure 1:
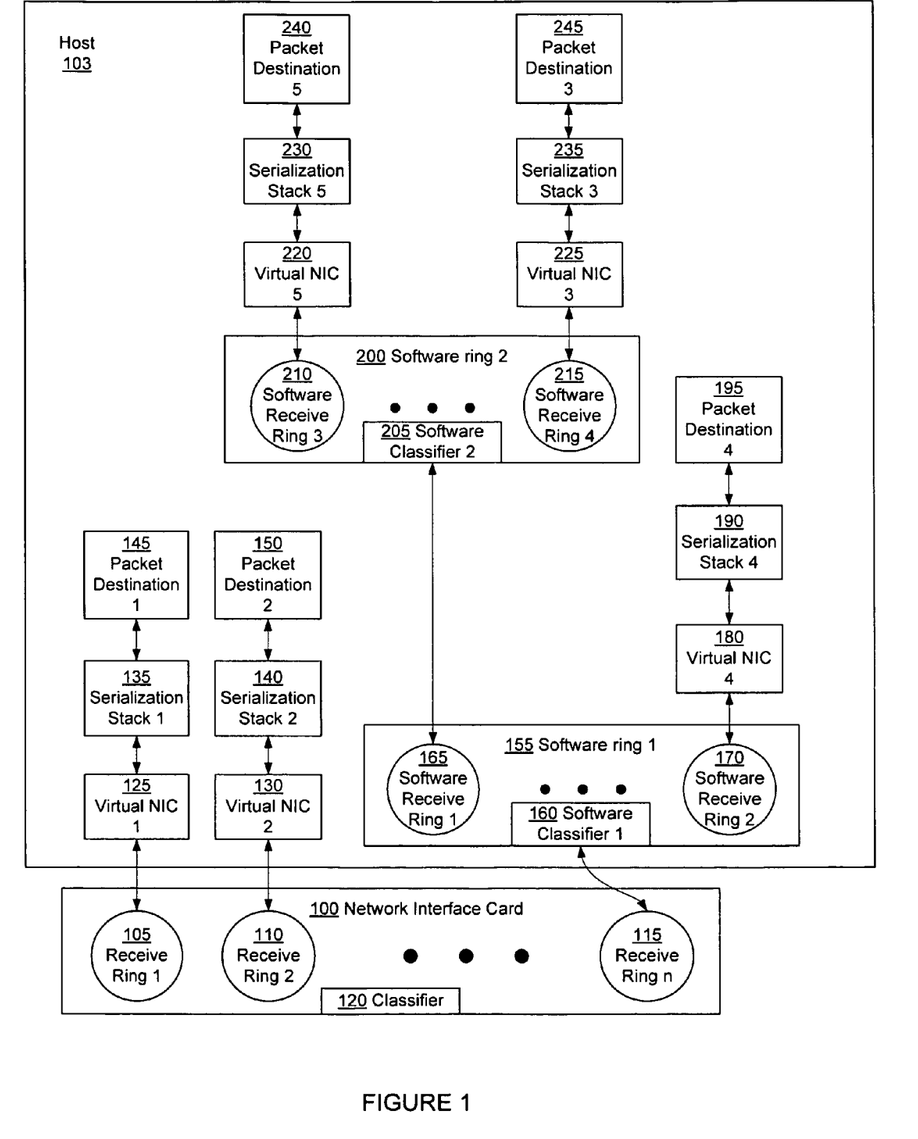
FIG. 1 shows a schematic diagram in accordance with one or more embodiments of the invention.

FIG. 1 shows a system in accordance with one or more embodiments of the invention. As shown in FIG. 1, the system includes a network interface card (100), multiple software rings (e.g., software ring 1 (155), software ring 2 (200)), multiple virtual NICs (e.g., virtual NIC 1 (125), virtual NIC 2 (130), virtual NIC 3 (225), virtual NIC 4 (180), virtual NIC 5 (220)), multiple receive rings (e.g., receive ring 1 (105), receive ring 2 (110), receive ring n (115)), and multiple software receive rings (e.g., software receive ring 1 (165), software receive ring 2 (170), software receive ring 3 (210), software receive ring 4 (215)). Each of these components is described below.

The network interface card (100), or NIC, refers to a piece of hardware designed to allow computers to communicate over a physical network (not shown). The NIC (100) includes a network interface (NI) (i.e., the hardware on the NIC used to interface with the network). For example, the NI may correspond to an RJ-45 connector, a wireless antenna, etc. The packets received by the NI are then sent to other components on the NIC (100) for processing. The NIC (100) may be connected to a host (103) via an expansion card. Alternatively, the NIC (100) may reside on the motherboard of the host (103). The NIC (100) is associated with a Media Access Control (MAC) address and may transfer data in interrupt mode, in which the NIC (100) alerts the host (103) of an available data transfer, or in polling mode, in which the host (103) requests data from the NIC (100). Those skilled in the art will appreciate that other modes of data transfer, such as programmed Input/Output (I/O) or Direct Memory Access (DMA), may be used for data transfer between the host (103) and the NIC (100).

The NIC (100) also includes multiple receive rings (e.g., receive ring 1 (105), receive ring 2 (110), receive ring n (115)) and a classifier (120). In one or more embodiments of the invention, the receive rings (e.g., receive ring 1 (105), receive ring 2 (110), receive ring n (115)) correspond to portions of memory within the NIC (100) used to temporarily store the received packets. Further, in one embodiment of the invention, a ring element of the receive rings (e.g., receive ring 1 (105), receive ring 2 (110), receive ring n (115)) may point to host memory. In one or more embodiments of the invention, the receive rings (e.g., receive ring 1 (105), receive ring 2 (110), receive ring n (115)) are implemented as ring buffers in the NIC (100). In one or more embodiments of the invention, a device driver (not shown) provides an interface between the NIC (100) and the host (103) and exposes the receive rings (e.g., receive ring 1 (105), receive ring 2 (110), receive ring n (115)) to the host. In one embodiment of the invention, the classifier (120) is configured to analyze the incoming network traffic, typically in the form of packets, received from the network (not shown).

In one embodiment of the invention, analyzing individual packets includes determining to which of the receive rings (e.g., receive ring 1 (105), receive ring 2 (110), receive ring n (115)) each packet is sent. In one embodiment of the invention, analyzing the packets by the classifier (120) includes analyzing one or more fields in each of the packets to determine to which of the receive rings (e.g., receive ring 1 (105), receive ring 2 (110), receive ring n (115)) the packets are sent. As an alternative, the classifier (120) may use the contents of one or more fields in each packet as an index into a data structure that includes information necessary to determine to which receive ring (e.g., receive ring 1 (105), receive ring 2 (110), receive ring n (115)) that packet is sent. The classifier (120) may be implemented entirely in hardware (i.e., the classifier (120) may be a separate microprocessor embedded on the NIC (100)), or the classifier (120) may be implemented in software stored in memory (e.g., firmware, etc.) on the NIC and executed by a microprocessor on the NIC (100).

In one or more embodiments of the invention, each receive ring (e.g., receive ring 1 (105), receive ring 2 (110), receive ring n (115)) is associated with a virtual NIC (e.g., virtual NIC 1 (125), virtual NIC 2 (130)). The virtual NICs (e.g., virtual NIC 1 (125), virtual NIC 2 (130)) provide an abstraction layer between the NIC (100) and the various packet destinations (e.g., packet destination 1 (145), packet destination 2 (150)) (e.g., containers and/or services) executing on the host (103). More specifically, each virtual NIC (e.g., virtual NIC 1 (125), virtual NIC 2 (130)) operates like a NIC (100). For example, in one embodiment of the invention, each virtual NIC (e.g., virtual NIC 1(125), virtual NIC 2 (130)) is associated with one or more Internet Protocol (IP) addresses, associated with one ore more MAC addresses, associated with one or more ports, and configured to handle one or more protocol types. Thus, while the host (103) may be operatively connected to a single NIC (100), packet destinations (e.g., packet destination 1 (145), packet destination 2 (150)) (e.g., containers, virtual machines, and/or services) executing on the host (103) operate as if the host (103) is bound to multiple NICs. Those skilled in the art will appreciate that a virtual NIC (e.g., virtual NIC 1 (125), virtual NIC 2 (130)) may be defined solely by one or more IP addresses or one or more MAC addresses, and that ports and protocols are not required to instantiate a virtual NIC.

Each of the virtual NICs (e.g., virtual NIC 1 (125), virtual NIC 2 (130)) is operatively connected to a corresponding serialization stack (e.g., serialization stack 1 (135), serialization stack 2 (140)). In one embodiment of the invention, each serialization stack (e.g., serialization stack 1 (135), serialization stack 2 (140)) includes functionality to process packets in accordance with various protocols used to send and receive packets (e.g., Transmission Communication Protocol (TCP), Internet Protocol (IP), User Datagram Protocol (UDP), etc.). Further, each serialization stack (e.g., serialization stack 1 (135), serialization stack 2 (140)) may also include functionality, as needed, to perform additional processing on the incoming and outgoing packets. This additional processing may include, but is not limited to, cryptographic processing, firewall routing, etc.

In one embodiment of the invention, each serialization stack (e.g., serialization stack 1 (135), serialization stack 2 (140)) includes network layer and transport layer functionality. In one embodiment of the invention, network layer functionality corresponds to functionality to manage packet addressing and delivery on a network (e.g., functionality to support IP, Address Resolution Protocol (ARP), Internet Control Message Protocol, etc.). In one embodiment of the invention, transport layer functionality corresponds to functionality to manage the transfer of packets on the network (e.g., functionality to support TCP, UDP, Stream Control Transmission Protocol (SCTP), etc.).

In one embodiment of the invention, each serialization stack (e.g., serialization stack 1 (135), serialization stack 2 (140)) includes a virtual serialization queue (not shown). In one embodiment of the invention, each virtual serialization queue corresponds to a data structure having at least two queues, an inbound queue and an outbound queue. Each of the queues within the virtual serialization queues is typically implemented as first-in first-out (FIFO) queues. Further, each virtual serialization queue is configured to send and receive packets from an associated virtual NIC (e.g., virtual NIC 1(125), virtual NIC 2 (130)) via an associated serialization stack (e.g., serialization stack 1 (135), serialization stack 2 (140)). In addition, each virtual serialization queue is configured to send and receive packets from one or more associated packet destinations (118) (e.g., containers and/or services). The structure of the virtual serialization queue is discussed in greater detail in FIG. 2.

In one embodiment of the invention, the virtual NIC (e.g., virtual NIC 1 (125), virtual NIC 2 (130)) may be bound to a virtual machine (e.g., Xen Domain) instead of a serialization stack (e.g., serialization stack 1 (135), serialization stack 2 (140)). In such cases, the virtual NIC is bound to an interface (e.g., a Xen interface), where the interface enables the virtual NIC to communicate to with the virtual machine. In one embodiment of the invention, the aforementioned virtual machine includes its own serialization stack and includes its own operating system (OS) instance, which may be different than the OS executing on the host.

Continuing with FIG. 1, the system also includes two software rings (e.g., software ring 1 (155), software ring 2 (160)). In one or more embodiments of the invention, a software ring is created when more virtual NICs (e.g., virtual NIC 1 (125), virtual NIC 2 (130), virtual NIC 3 (225)virtual NIC 4 (180), virtual NIC 5 (220)) are needed than there are receive rings (e.g., receive ring 1 (105), receive ring 2 (110), receive ring n (115)) on the physical NIC (100). In one embodiment of the invention, each of the software receive rings is located in the Media Access Control (MAC) layer of the host (103). As shown in FIG. 1, each software ring (e.g., software ring 1 (155), software ring 2 (160)) is associated with multiple software receive rings (e.g., software receive ring 1 (165), software receive ring 2 (170), software receive ring 3 (210), software receive ring 4 (215)). In one or more embodiments of the invention, the software receive rings are configured to temporarily store received packets in memory, similar to receive rings (e.g., receive ring 1 (105), receive ring 2 (110), receive ring n (115)) on the physical NIC (100).

Software classifiers (e.g., software classifier 1 (160), software classifier 2 (205)) associated with each software ring (e.g., software ring 1 (155), software ring 2 (160)) analyze each received packet to determine to which software receive ring (e.g., software receive ring 1 (165), software receive ring 2 (170), software receive ring 3 (210), software receive ring 4 (215)) to send the packet. Similar to the classifier (120) on the NIC (100), the software classifiers (e.g., software classifier 1 (160), software classifier 2 (205)) may use the contents of one or more fields in the packet to direct the packet to the appropriate software receive ring (e.g., software receive ring 1 (165), software receive ring 2 (170), software receive ring 3 (210), software receive ring 4 (215)). Those skilled in the art will appreciate that an arbitrary number of software receive rings (e.g., software receive ring 1 (165), software receive ring 2 (170), software receive ring 3 (210), software receive ring 4 (215)) may be associated with a software ring (e.g., software ring 1 (155), software ring 2 (160)).

In addition, each software receive ring (e.g., software receive ring 1 (165), software receive ring 2 (170), software receive ring 3 (210), software receive ring 4 (215)) on each software ring (e.g., software ring 1 (155), software ring 2 (160)) is associated with a virtual NIC (e.g., virtual NIC 3 (225), virtual NIC 4 (170), virtual NIC 5 (220)), which is associated with a serialization stack (e.g., serialization stack 3 (235), serialization stack 4 (190), serialization stack 5 (230)). As described above, each virtual NIC (e.g., virtual NIC 3 (225), virtual NIC 4 (170), virtual NIC 5 (220)) implements the functionality of a physical NIC in software; each serialization stack (e.g., serialization stack 3 (235), serialization stack 4 (190), serialization stack 5 (230)) is responsible for implementing network layer and transport layer functionality. Further, each serialization stack (e.g., serialization stack 3 (235), serialization stack 4 (190), serialization stack 5 (230)) may be operatively connected to a packet destination (e.g., packet destination 4 (195), packet destination 5 (240), packet destination 6 (245)). In one or more embodiments of the invention, each packet destination (e.g., packet destination 4 (195), packet destination 5 (240), packet destination 6 (245)) corresponds to a container or service configured to send and receive packets from a physical network.

As shown in FIG. 1, a software ring (e.g., software ring 1 (155), software ring 2 (160)) may be created on top of a receive ring (e.g., receive ring n (115)), or a software ring may be created on top of another software ring (e.g., software ring 1 (155)). In one or more embodiments of the invention, software rings (e.g., software ring 1 (155), software ring 2 (160)) enable packets from the physical network to be differentiated among multiple packet destinations (e.g., packet destination 4 (195), packet destination 5 (240), packet destination 6 (245)) corresponding to containers, virtual machines, or services on a single physical host (103). Those skilled in the art will appreciate that any number of levels of virtual NICs (e.g., virtual NIC 1 (125), virtual NIC 2 (130), virtual NIC 3 (225) virtual NIC 4 (180), virtual NIC 5 (220)) and software rings (e.g., software ring 1 (155), software ring 2 (200)) may be created on top of a physical NIC (100), and that these levels may be structured in multiple ways.

Figure 2:
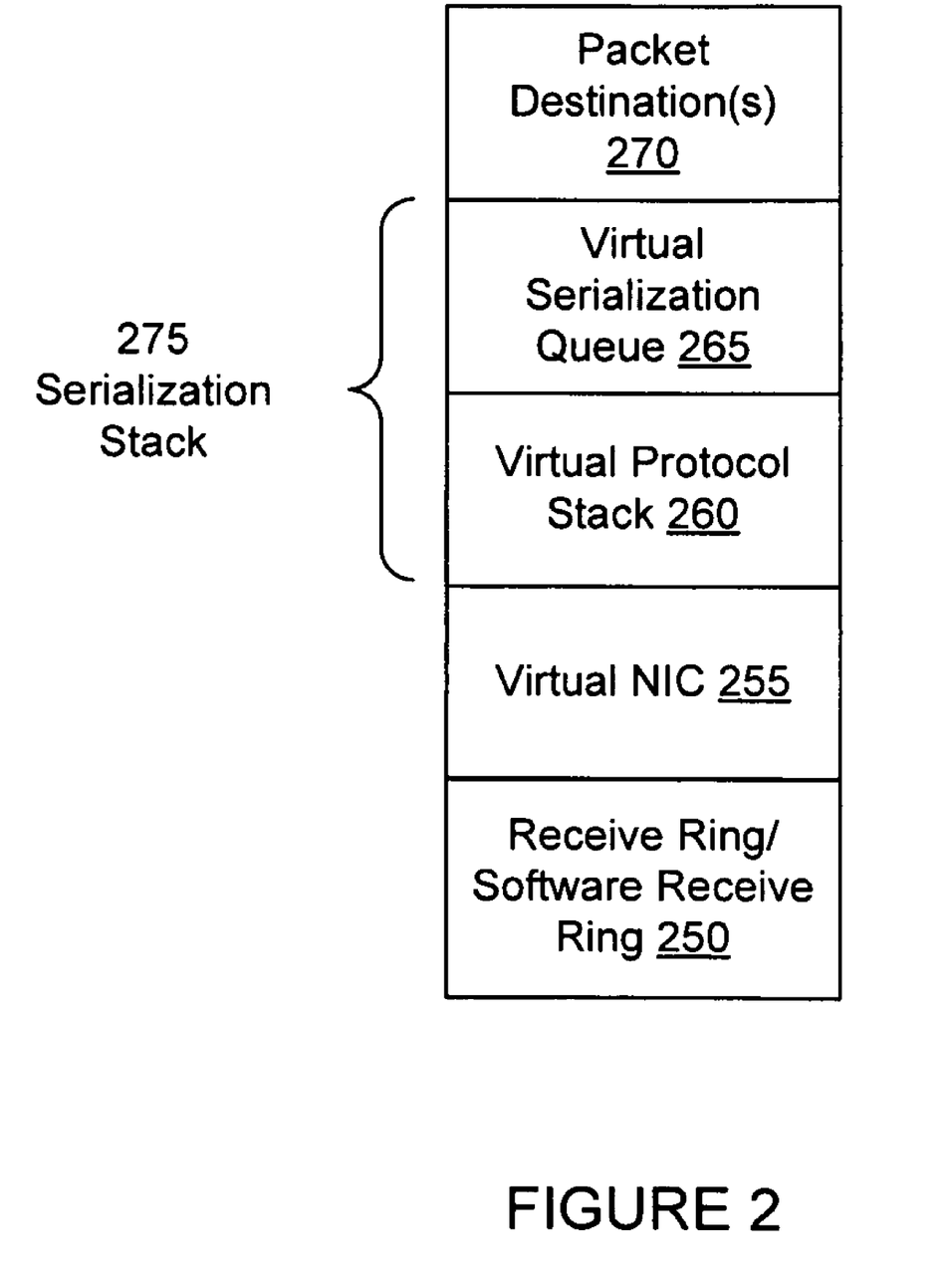
FIG. 2 shows a virtual network stack in accordance with one or more embodiments of the invention.

FIG. 2 shows a serialization stack in accordance with one embodiment of the invention. Various components described above in FIG. 1 may be collectively referred to as a serialization stack (275). In one embodiment of the invention, the serialization stack (275) includes a virtual protocol stack (260) and a virtual serialization queue (265) and is associated with a virtual NIC (255). In one embodiment of the invention, the serialization stack (275) may be bound to one or more receive rings or software receive rings (250) (depending on the implementation). Further, the virtual serialization stack (275) may be bound to one or more packet destinations (270) (e.g., containers and/or services). All of the aforementioned components in the serialization stack (275) are bound together such that a packet received by the virtual NIC (255) associated with a particular serialization stack (275) is sent through the components of the serialization stack (275) until the packet reaches the packet destination (270) (e.g., containers and/or services) associated with the particular serialization stack (275). In one embodiment of the invention, the host includes multiple serialization stacks (275), each of which includes a virtual protocol stack (260) and a virtual serialization queue (265).

Figure 3:
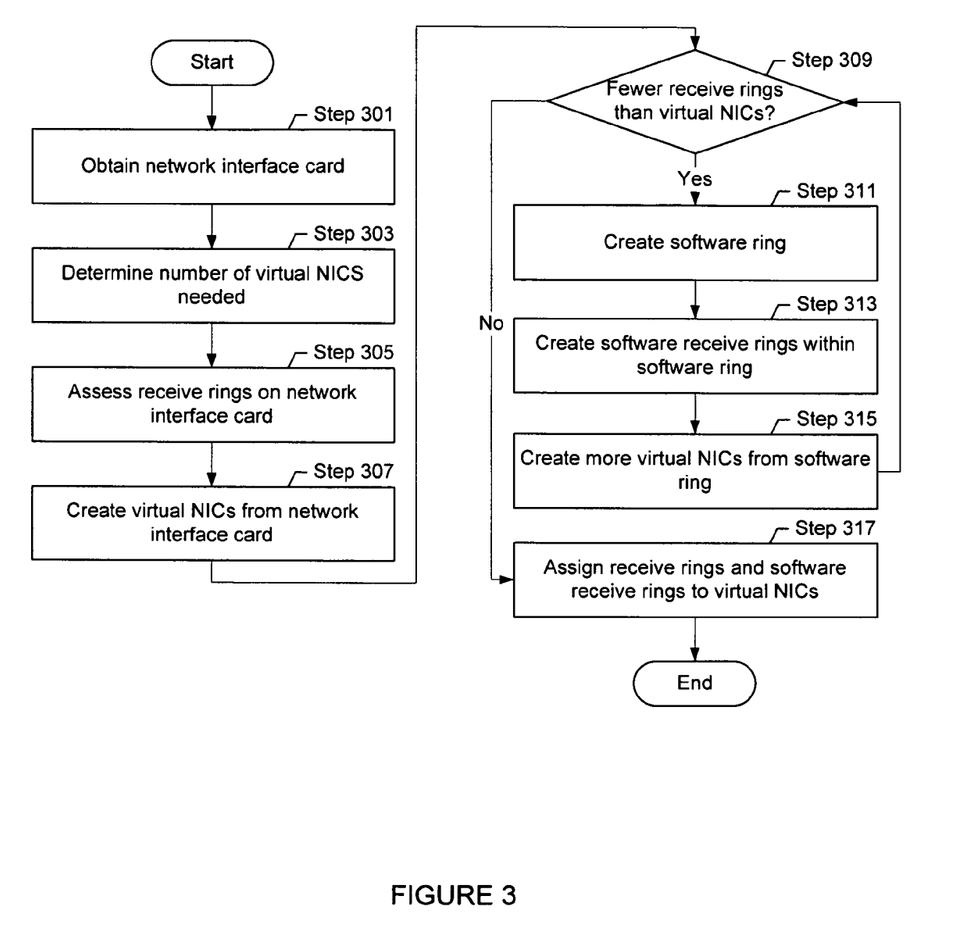
FIGS. 3-4 show flow charts in accordance with one or more embodiments of the invention.

FIG. 3 shows a flow diagram in accordance with one or more embodiments of the invention. First, a network interface card (NIC) is obtained (Step 301). As stated above, the NIC is connected to a host and is responsible for sending and receiving packets between the host and a physical network. Once the NIC is obtained, a determination is made regarding the number of virtual NICs needed on the host (Step 303). In one or more embodiments of the invention, the number of virtual NICs needed corresponds to the number of packet destinations on the host. Further, in one or more embodiments of the invention, packet destinations on the host correspond to containers, virtual machines, or services that send and receive packets. For example, a virtual NIC may be created for each virtual machine on the host, or a virtual NIC may be created for each application running on each virtual machine on the host.

Once the number of virtual NICs to be created has been determined, the receive rings on the NIC are assessed (Step 305). In one or more embodiments of the invention, a single receive ring corresponds to a single virtual NIC and temporarily stores packets to be sent to the virtual NIC. As a result, when more virtual NICs are needed than there are receive rings on the NIC, one or more soft rings is created to appropriately route packets to the extra virtual NICs.

Virtual NICs are first created from the NIC (Step 307). Next, a determination is made about whether there are fewer receive rings on the NIC than there are virtual NICs (Step 309). If not, the receive rings on the NIC are assigned to virtual NICs (Step 317). Otherwise, a software ring is created on top of one of the receive rings on the NIC (Step 311). A set of software receive rings is then created within the software ring (Step 313) and more virtual NICs are created and assigned to the software ring (Step 315). As described in FIG. 1, the software ring is associated with a software classifier, which directs packets to the appropriate software receive rings based on the contents of the fields in the packet headers.

Once the virtual NICs have associated with the software ring, a determination is made about whether more virtual NICs need to be created (Step 309). If so, the process is repeated until all virtual NICs can be assigned a receive ring or software receive ring; then the receive rings and software receive rings are assigned to the virtual NICs (Step 317). As stated above, software rings can be arbitrarily created on top of receive rings or software receive rings with the software rings. As a result, different structures involving software rings can be created to handle the same number of virtual NICs.

Figure 4:
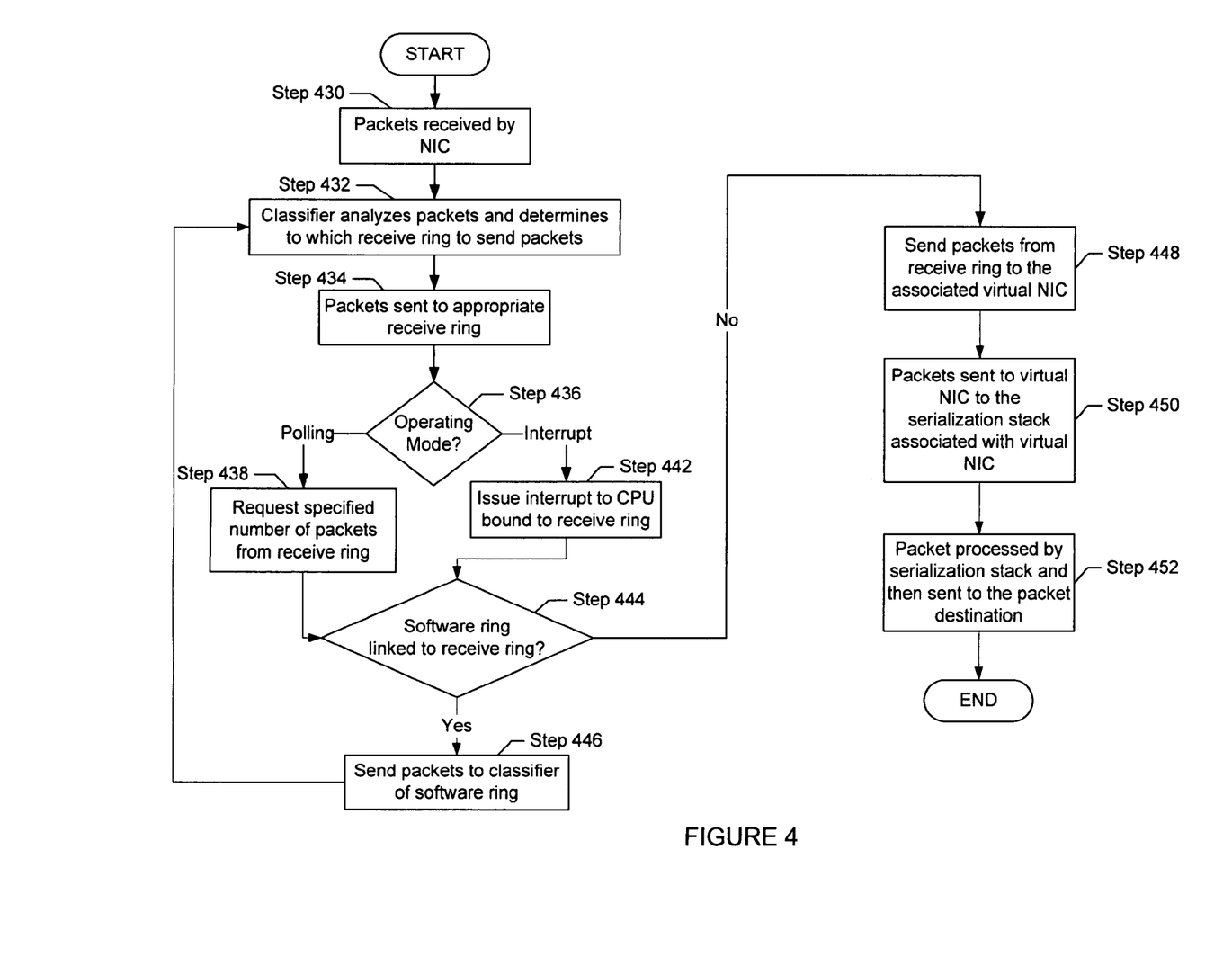

FIG. 4 shows a flow diagram in accordance with one or more embodiments of the invention. Initially, packets are received by a NIC (Step 430). Next, a classifier associated with the NIC determines which receive ring on the NIC to send the packets to (Step 432). The packets are then sent to the appropriate receive ring (Step 434) based on the classifier's assessment. At this stage, the processing of the packets differs depending on mode in which the virtual serialization queue (which is bound to the receive ring or connected to the receive ring via a software ring) is operating. The aforementioned virtual serialization queue is associated with the serialization stack bound to the virtual NIC associated with the receive ring. Continuing with the discussion of FIG. 4, the processing of the packets depends on whether the virtual serialization queue is operating in polling mode or interrupt mode (Step 436).

If the virtual serialization queue is operating in polling mode, then the packets remain in the receive ring until the virtual serialization queue requests a specified number of packets from the receive ring (Step 438). In one embodiment of the invention, the virtual serialization queue does not request any packets when there are packets already queued on the virtual serialization queue. In one or more embodiments of the invention, the virtual serialization queue retrieves all packets from the receive ring when a request is made for packets. Those skilled in the art will appreciate that the receive rings store a finite number of packets. Thus, if the receive rings receive packets at a faster rate than the rate at which the corresponding virtual serialization queues requests the packets, the receive rings will eventually fill completely with packets and packets received after this point are dropped until packets on the receive rings are requested and processed.

Alternatively, if the virtual serialization queue is operating in interrupt mode, then an interrupt is issued to the CPU bound to the receive ring (i.e., the CPU bound to the virtual serialization queue that is bound to the stack associated with the receive ring) (Step 442). The packets are then sent to the virtual serialization queue or an intermediate software ring based on the structure of the system.

Once the packets are requested, a determination is made about whether a software ring is linked to the receive ring (Step 444). If so, the packets are sent to the software classifier corresponding to the software ring (Step 446), which further sends the packets to the appropriate software receive rings according to the operating mode (Step 434-Step 444). If not, the packets are sent to the virtual NIC (Step 448). The virtual NIC subsequently sends the packets to the associated serialization stack (Step 450), where the packets are processed and then sent to the packet destination (e.g., a virtual machine, a container, a service, etc.) (Step 452).

Figure 5:
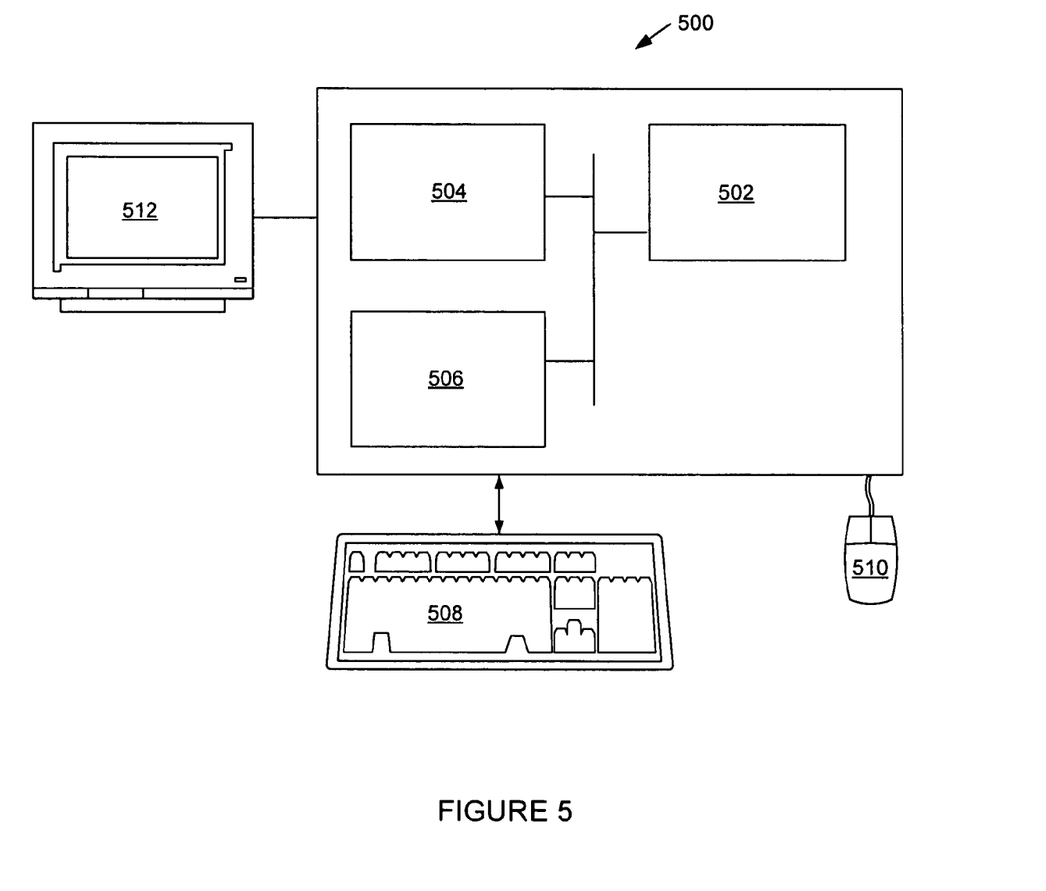
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., network interface card, virtual network interface card, software ring, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for virtualizing a network interface card, comprising:

creating a first plurality of virtual NICs by a host;
assigning each of a plurality of receive rings on the network interface card (NIC) to one of the first plurality of virtual NICs;
determining whether the first plurality of virtual NICs is greater in number than the plurality of receive rings on the NIC;
in response to determining that the first plurality of virtual NICs is greater in number than the plurality of receive rings on the NIC:
creating a first software ring corresponding to one of the plurality of receive rings on the NIC;
creating a first plurality of software receive rings associated with the first software ring;
creating a second plurality of virtual NICs; and
assigning each of the first plurality of software receive rings to one of the second plurality of virtual NICs,
wherein the plurality of receive rings on the NIC is lesser in number than a sum of the first plurality of virtual NICs and the second plurality of virtual NICs.

2. The method of claim 1, further comprising:
creating a second software ring associated with one selected from a group consisting of one of the first plurality of virtual NICs and one of the second plurality of virtual NICs;
creating a second plurality of software receive rings associated with the second software ring;
creating a third plurality of virtual network interface cards; and
assigning each of the second plurality of software receive rings to one of the third plurality of virtual NICs.

3. The method of claim 1, wherein packets are sent from the NIC to one of the plurality of receive rings on the NIC using a classifier associated with the NIC, and wherein packets are sent from the first software ring to one of the plurality of software receive rings associated with the first software ring using a software classifier associated with the first software ring.

4. The method of claim 1, wherein each of the second plurality of virtual NICs is associated with one of a plurality of serialization stacks.

5. The method of claim 4, wherein each of the plurality of serialization stacks is associated with one of a plurality of packet destinations.

6. The method of claim 5, wherein each of the plurality of packet destinations is one selected from a group consisting of a container, a virtual machine, and a service.

7. The method of claim 1, wherein the first software ring is located in a Media Access Control (MAC) layer of a host.

8. A system, comprising:
a network interface card (NIC) comprising a plurality of receive rings; and
a host operatively connected to the NIC, comprising:
a first plurality of virtual NICs, wherein the first plurality of virtual NICs is greater in number than the plurality of receive rings on the NIC;
a first software ring located in a Media Access Control (MAC)lay er of the host and comprising a software classifier;
a first plurality of software receive rings associated with the first software ring; and
a second plurality of virtual NICs;
wherein each of the plurality of receive rings is associated with one selected from a group consisting of one of the first plurality of virtual NICs and the first software ring, wherein at least one of the first plurality of software receive rings is associated with one of the second plurality of virtual NICs; and wherein the plurality of receive rings on the NIC is lesser in number than a sum of the first plurality of virtual NICs and the second plurality of virtual NICs.

9. The system of claim 8, further comprising:

a second software ring configured to receive packets from one of the first plurality of software receive rings;

a second plurality of software receive rings associated with the second software ring; and a third plurality of virtual NICs, wherein at least one of the second plurality of software receive rings is associated with one of the third plurality of virtual NICs.

10. The system of claim 8, further comprising:

a plurality of serialization stacks, wherein at least one of the first plurality of virtual NICs is associated with one of the plurality of serialization stacks.

11. The system of claim 10, further comprising:

a plurality of packet destinations, wherein each of the plurality of serialization stacks is associated with one of the plurality of packet destinations.

12. The system of claim 11, wherein each of the plurality of packet destinations is at least one selected from a group consisting of a container, a virtual machine, and a service.

13. A computer readable medium having computer readable program code embodied therein for causing a computer system to execute a method for virtualizing a network interface card (NIC), the method comprising:

creating a first plurality of virtual NICs;

assigning each of a plurality of receive rings on the network interface card (NIC) to one of the first plurality of virtual NICs;

determining whether the first plurality of virtual NICs is greater in number than the plurality of receive rings on the NIC;

in response to determining that the first plurality of virtual NICs is greater in number than the plurality of receive rings on the NIC:

creating a first software ring corresponding to one of the plurality of receive rings on the NIC;

creating a first plurality of software receive rings associated with the first software ring;

creating a second plurality of virtual NICs; and assigning each of the first plurality of software receive rings to one of the second plurality of virtual NICs, wherein the plurality of receive rings on the NIC is lesser in number than a sum of the first plurality of virtual NICs and the second plurality of virtual NICs.

14. The computer usable medium of claim 13, further comprising:

creating a second software ring associated with one selected from a group consisting of one of the first plurality of virtual NICs and one of the second plurality of virtual NICs;

creating a second plurality of software receive rings associated with the second software ring;

creating a third plurality of virtual network interface cards; and assigning each of the second plurality of software receive rings to one of the third plurality of virtual NICs.

15. The computer usable medium of claim 13, wherein packets are sent from the NIC to one of the plurality of receive rings on the NIC using a classifier associated with the NIC, and wherein packets are sent from the first software ring to one of the plurality of software receive rings associated with the first software ring using a software classifier associated with the first software ring.

16. The computer usable medium of claim 13, wherein each of the second plurality of virtual NICs is associated with one of a plurality of serialization stacks.

17. The computer usable medium of claim 16, wherein each of the plurality of serialization stacks is associated with one of a plurality of packet destinations.

18. The computer usable medium of claim 17, wherein each of the plurality of packet destinations is one selected from a group consisting of a container, a virtual machine, and a service.

19. The computer usable medium of claim 13, wherein the first software ring is located in a Media Access Control (MAC) layer of a host.

* * * * *

UNITED STATES PATENT AND TRADEMARK OFFICE
CERTIFICATE OF CORRECTION

PATENT NO. : 7,672,299 B2  Page 1 of 1
APPLICATION NO. : 11/479046
DATED : March 2, 2010
INVENTOR(S) : Nicolas G. Droux et al.

It is certified that error appears in the above-identified patent and that said Letters Patent is hereby corrected as shown below:

In Claim 8, column 10 (line 59), please replace the words "(MAC)lay er" with --(MAC) layer--.

In Claim 14, Column 12 (line 9), please replace "usable" with --readable--.

In Claim 15, Column 12 (line 21), please replace "usable" with --readable--.

In Claim 16, Column 12 (line 28), please replace "usable" with --readable--.

In Claim 17, Column 12 (line 31), please replace "usable" with --readable--.

In Claim 18, Column 12 (line 34), please replace "usable" with --readable--.

In Claim 19, Column 12 (line 38), please replace "usable" with --readable--.

Signed and Sealed this

Eighteenth Day of May, 2010

David J. Kappos
*Director of the United States Patent and Trademark Office*